United States Patent Office 3,504,583
Patented Apr. 7, 1970

3,504,583
LATHES
Julius Harman, Baginton, England, assignor to Alfred Herbert Limited, Edgwick, Coventry, Warwickshire, England, a British company
Filed Nov. 13, 1967, Ser. No. 682,094
Claims priority, application Great Britain, Nov. 11, 1966, 50,647/66
Int. Cl. B23b 19/02
U.S. Cl. 82—30          8 Claims

ABSTRACT OF THE DISCLOSURE

A lathe spindle is provided at its end with an annular toothed coupling member for engagement with a like member on a chuck. A draft member extends through the spindle and has a head adapted for inter-locking engagement with the toothed coupling member on the chuck for applying an axial pull to the chuck for accurately and firmly inter-engaging the two toothed coupling members.

---

This invention relates to lathes and has an an object to provide a lathe having means for the rapid and simple mounting of a chuck or other work-holding device on a lathe spindle.

A lathe in accordance with the invention has a hollow spindle on the end of which is mounted one part of an annular toothed coupling extending in a plane perpendicular to the spindle axis and having teeth shaped to mesh with a co-acting coupling part on a chuck or other work-holding device so as to align the two coupling parts accurately when axial pressure is applied thereto, and means extending through the spindle for engaging such a coupling part of the chuck or other work-holding device to apply axial pressure thereto.

Figure 1A:
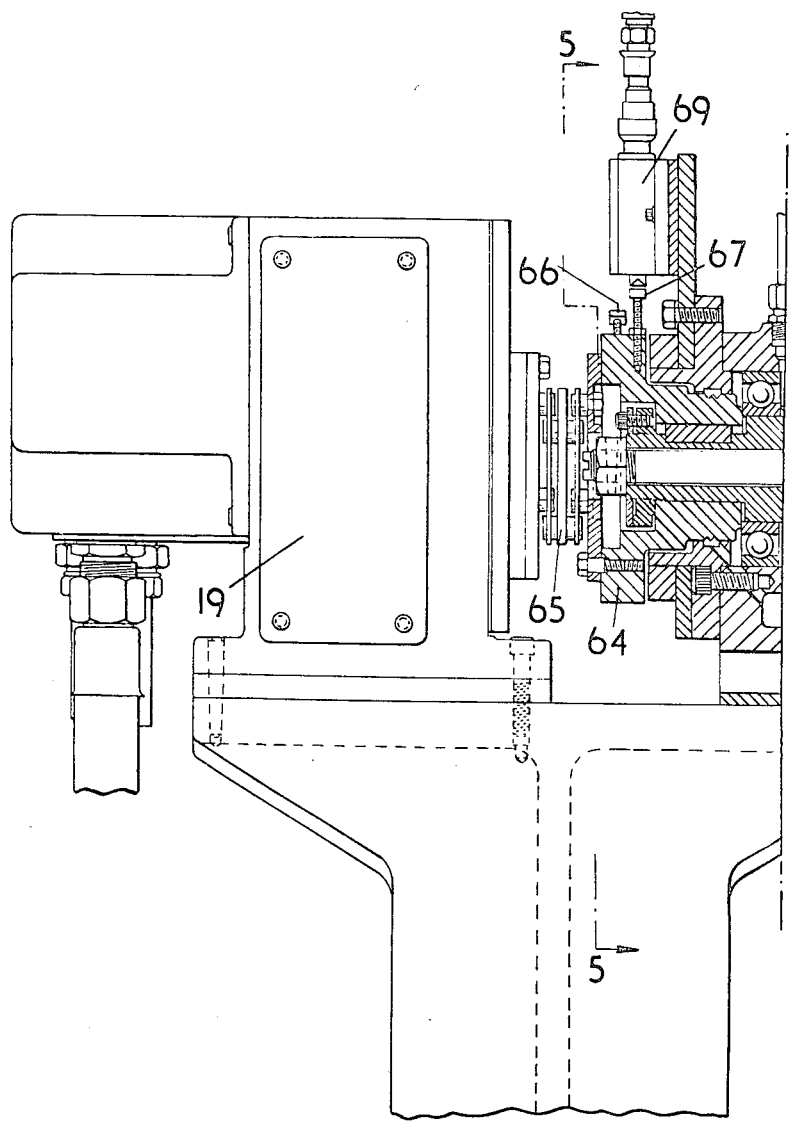
Figure 1B:
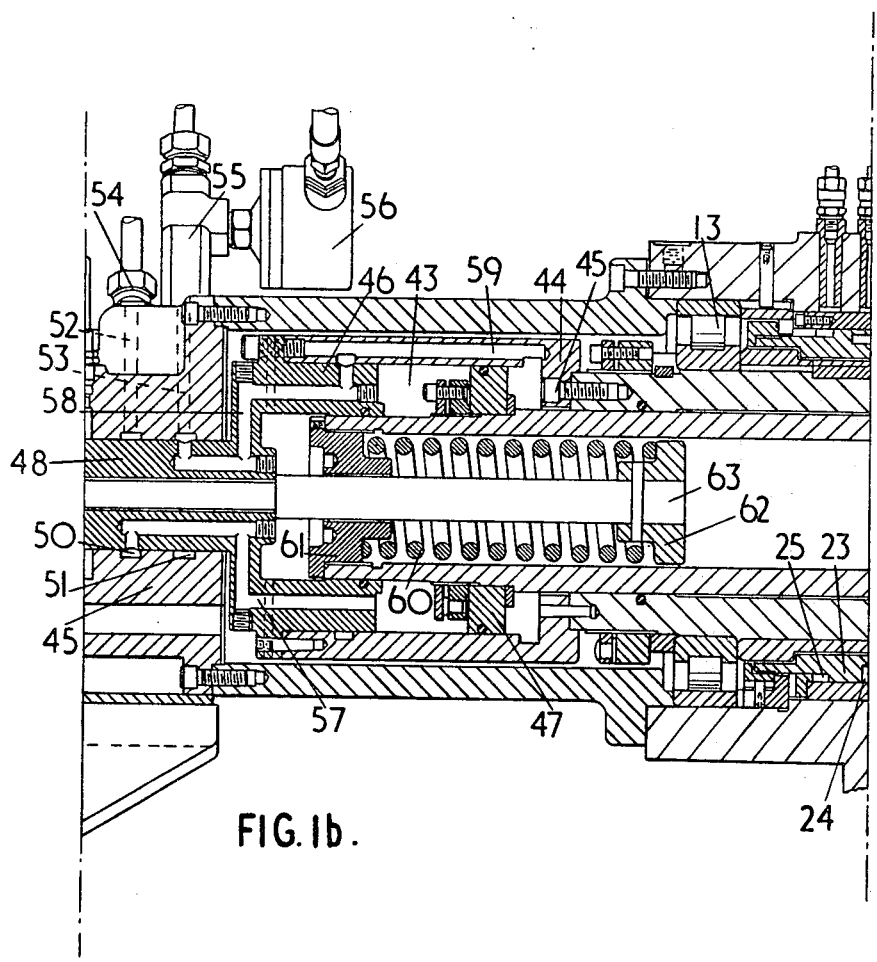
Figure 1C:
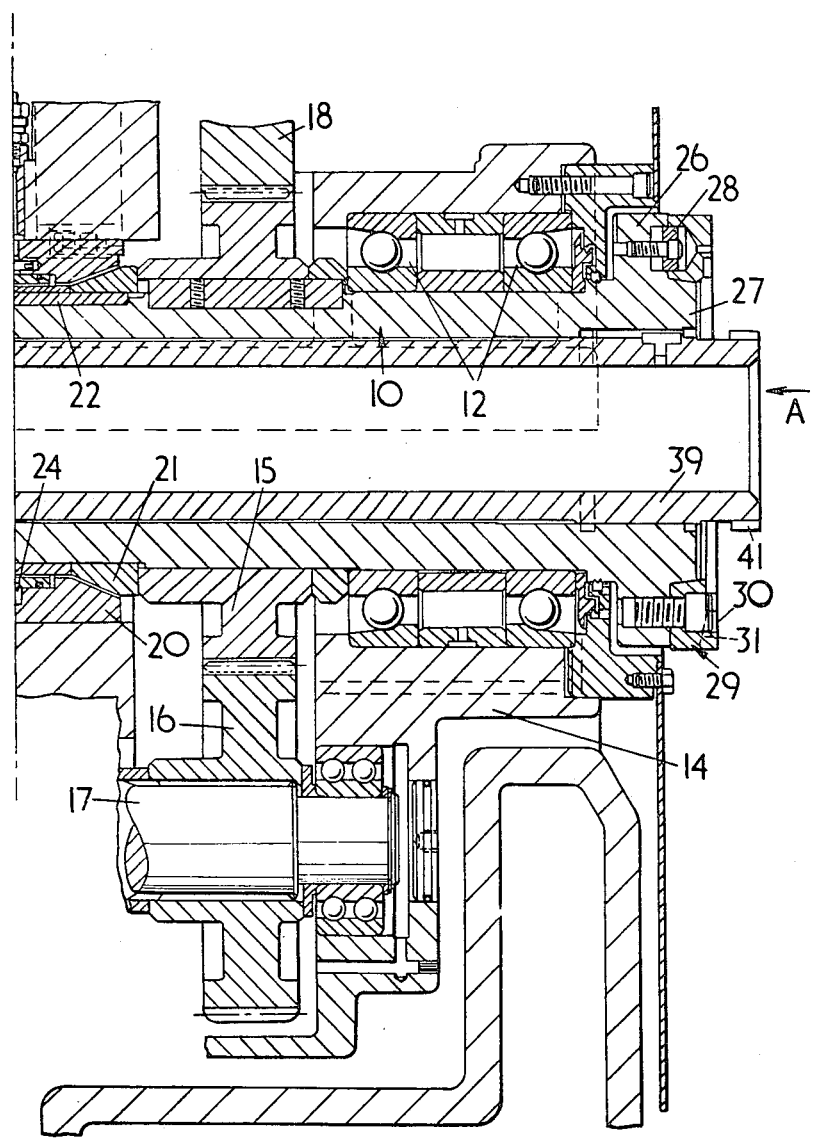
Figure 2:
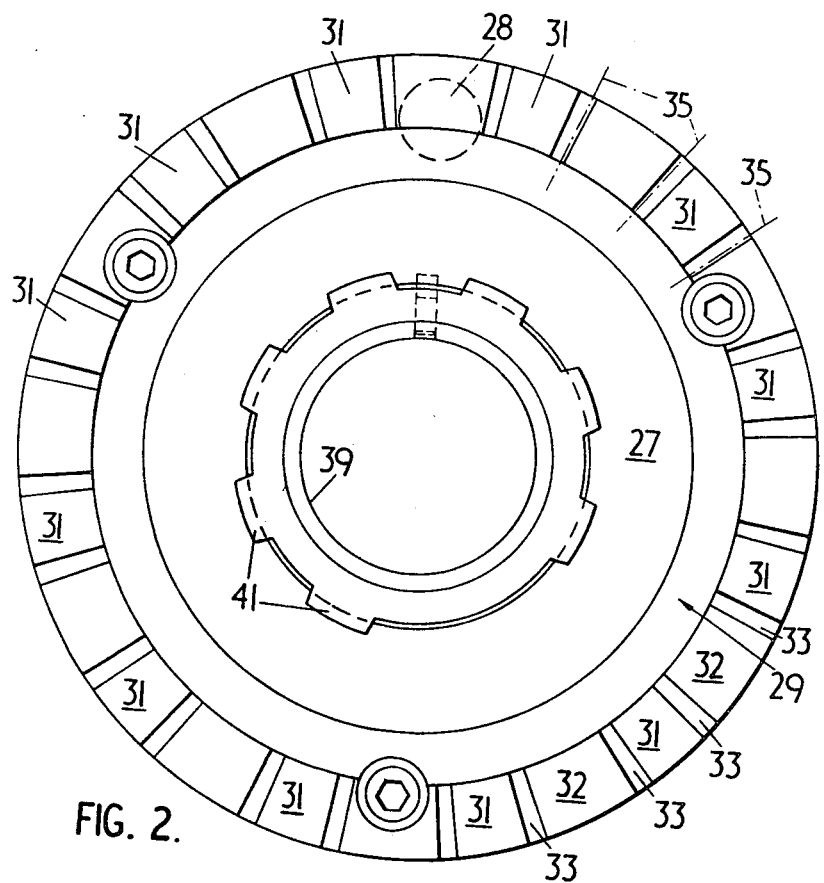
Figure 3:
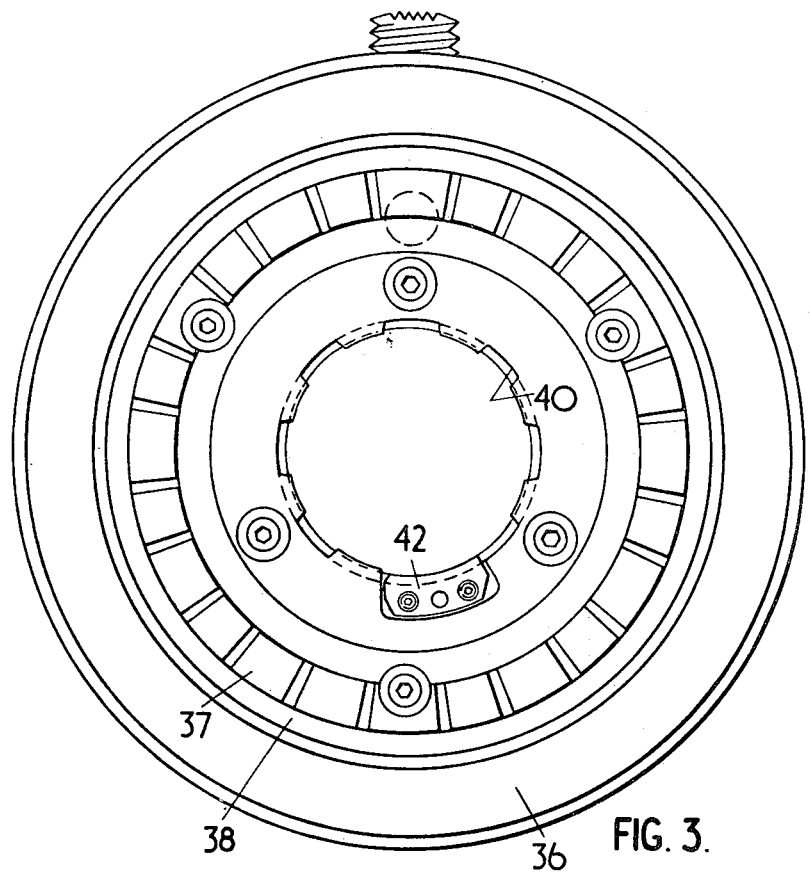
Figure 4:
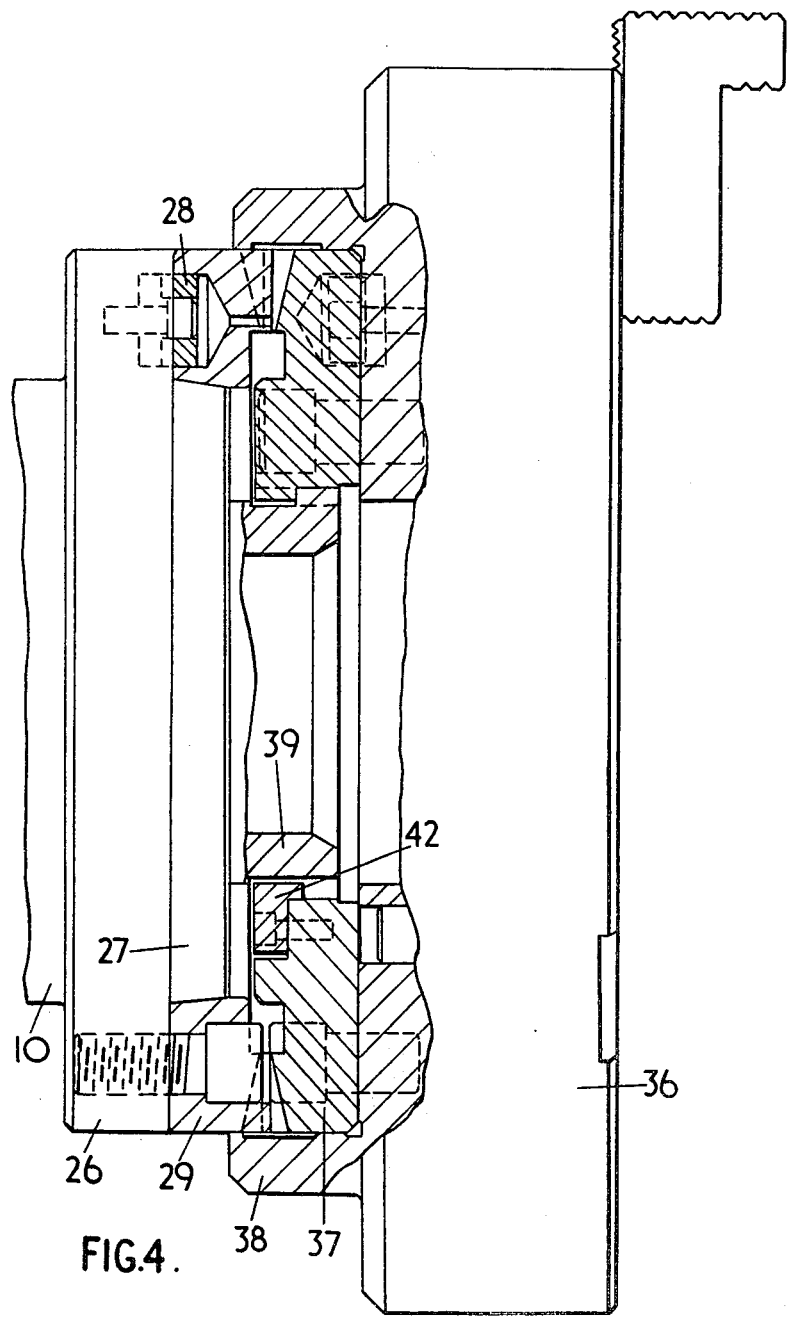
Figure 5:
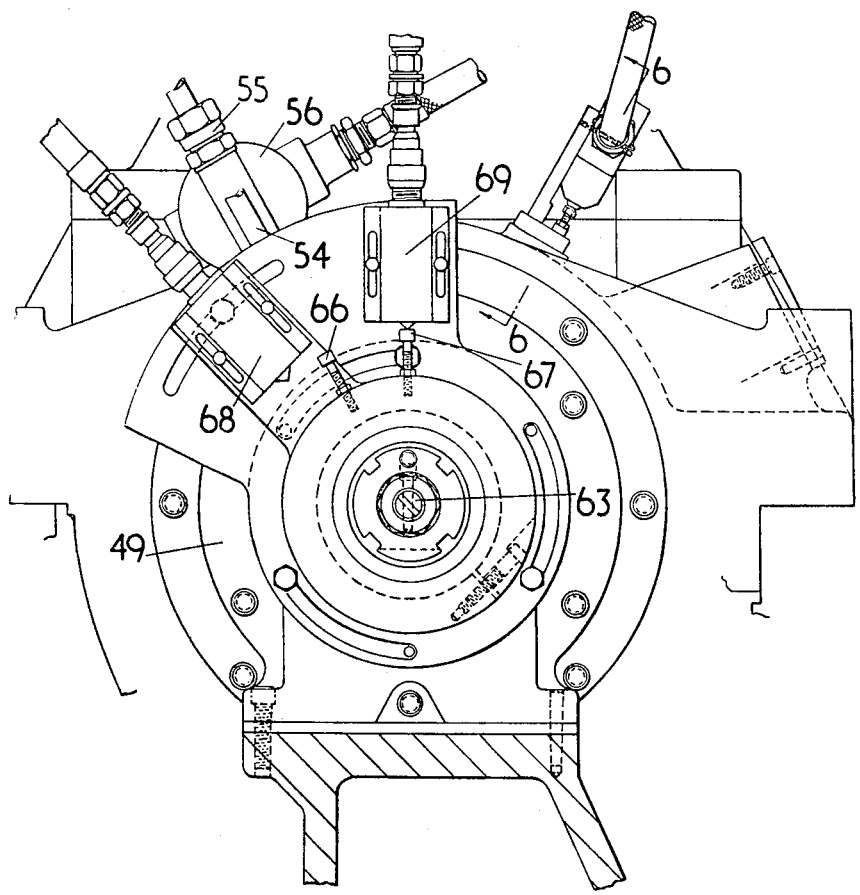
Figure 6:
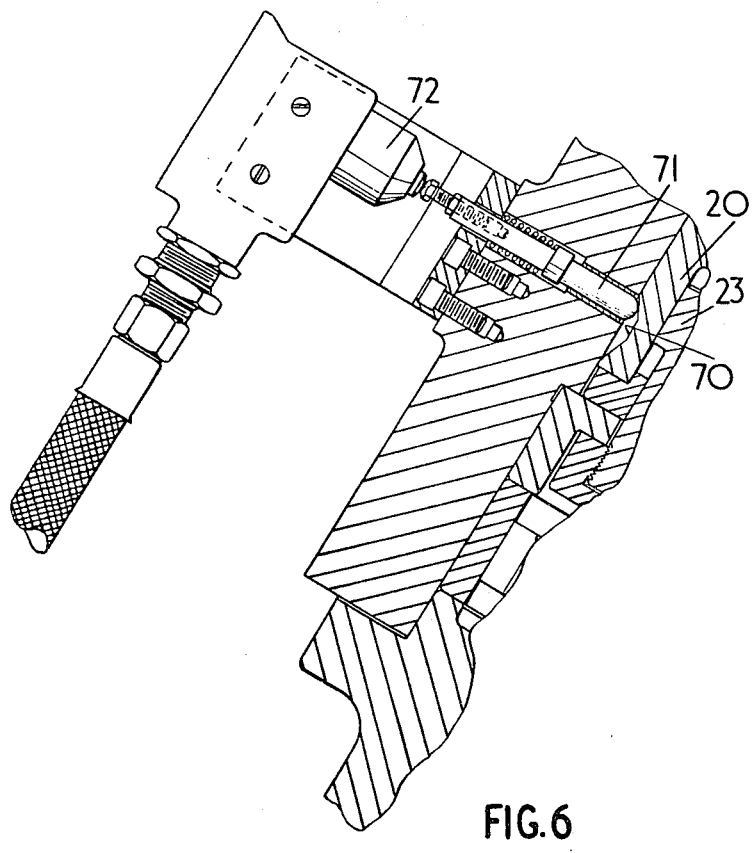

In the accompanying drawings:

FIGURES 1a, 1b and 1c make up a fragmentary cross-section through the headstock of a lathe in accordance with the invention, FIGURE 2 is an end view of the lathe spindle looking in the direction of arrow A in FIGURE 1, FIGURE 3 is a rear elevation of a chuck for use on the lathe, FIGURE 4 is a fragmentary cross section showing the chuck in position on the end of the spindle, FIGURE 5 is a section on the line 5—5 in FIGURE 1 and FIGURE 6 is a fragmentary section on the line 6—6 in FIGURE 5.

The overall layout of the lathe is as described in our copending U.S. patent application No. 658,845. The lathe spindle 10 which is carried by bearings 12, 13 within the headstock 14 has a gear 15 secured to it. This gear 15 meshes with a gear 16 connected via a shaft 17 to a main drive (not shown). The gear 16 also meshes with a further gear 18 driven by a creep drive unit (also not shown), under the control of a creep control unit 19 coupled to the spindle 10 as will be hereinafter explained.

The spindle 10 can be clamped in any desired position by means of an hydraulically movable ring 20 having a frusto-conical face which is engageable with a frusto-conical ring 21 keyed to the spindle 10 by means of a key 22. The ring 20 is slidable over an insert 23 shaped to define a chamber 24 between the ring 20 and the insert 23, such that introduction of hydraulic fluid under pressure into the chamber 24 will cause the frusto-conical surface of the ring 20 to be engaged with the ring 21. A chamber 25 is also provided, into which hydraulic fluid under pressure is introduced to cause the ring 20 to move in the opposite direction.

The nose of the spindle 10 is provided with a flange 26 and has a frusto-conical forwardly projecting part 27. The projecting parts 27 and a locating element 28 on the flange 26, serve to locate in an accurately predetermined position on the spindle nose, a toothed coupling ring 29. As shown in FIGURE 1 the internal periphery of this ring is of frusto-conical form shaped to fit precisely over the frusto-conical projecting part 27. The ring 29 is formed with an accurate bore which receives the locating element 28. The ring 29 has a front face 30 which is basically of planar form extending in a plane perpendicular to the axis of the spindle 10. The ring 29 is formed with accurate grooves 31 so that the front face 30 of the ring 29 actually forms the crests of teeth 32 with inclined flanks 33. In the example at present described the ring 29 has twelve teeth 32.

Purely by way of example the grooves 31 may be formed by utilising a milling cutter for rough machining of the grooves and a profile grinder for finish machining. Both the cutter and the grinder would have effective cutting faces of frusto-conical form inclined to one another, in a radial cross-section, at an angle of 60°. During the machining operations first the cutter, and then the grinder are traversed in a radial direction relative to the ring along a path inclined to the plane of the ring. The width of the cutter and the grinder used and the inclination of the path taken thereby to the plane of the ring are so chosen that imaginary lines 35 can be drawn on the flanks 33 in a plane spaced from and parallel to the plane of the front face of the ring and extending radially relative to the ring at equi-angularly spaced positions around the ring.

Thus, when two rings of identical tooth formation are lain one on top of another with the teeth of one inter-digited with the teeth of the other, the flanks of the teeth 32 of the two rings will make face contact only when the rings are co-axial and one is turned through 15° relative to the other.

If the two rings are pressed together in an axial direction the rings will tend to take up a position in which they are coaxial and relatively orientated as above described. The chuck 36 shown in FIGURE 3 is provided with a toothed coupling ring 37 having a toothed form identical to that of the ring 29. The ring 37 is mounted within a circular recess in the rear surface of the chuck, which may be of any desired configuration. There is therefore provided a skirt portion 38 on the chuck which, as shown in FIGURE 4, encloses the two toothed coupling rings 29, 37 when the chuck is in position on the spindle to prevent the ingress of foreign matter into the grooves of the rings 29, 37.

The spindle 10 is hollow and, for applying the necessary axial pressure to the toothed rings 29, 37 there is provided a draft member 39 which extends through the centre of the spindle 10. This draft member 39 is adapted to co-act with the toothed coupling ring 27 on the chuck. To this end the toothed coupling ring 37 is formed with a splined central hole 40 the end of the member 39 is formed with a co-acting splined head 41 which can be inserted through the splined hole 40. After insertion of the head 41 through the hole 40 until the splines on the head 41 have passed beyond the splines within the hole 40 the ring 37 can be turned relative to the member 39 to a position such that the end of the splines are inter-engaged to prevent withdrawal of the member 39 from the hole 40. To limit such turning movement the head 41 has one tooth missing and the ring 37 has secured to it a stop member 42 which can pass through the enlarged gap in the periphery of the head 41 where the spline is missing. The stop 42 extends to a position in which it can engage the splines of the head 41 after this has been passed beyond the splines of the hole 40. The relative turning motion between the member 39 and the ring 37 is limited, thereby to 22½°, the splines of the two parts being spaced apart by 45°.

For axially displacing the draft member 39 relative to the spindle 10 there is provided an hydraulic piston and cylinder unit 43 at the end of the spindle opposite the nose thereof. This unit comprises a cylinder 44 which is secured by bolts 45 to the end of the spindle. The cylinder 44 is capped by a cup-shaped member 46 in which the end of the draft member 39 is sealingly and slidingly engaged. A piston 47 is secured to the draft member 39 and sealingly and slidingly engages the interior of the cylinder 44. The cup-shaped member 46 is formed with a stem 48 which runs in a bore in a fixed body 49. The body 49 is formed internally with a pair of grooves 50, 51 which are connected via drillings 52, 53 in the body 49 to external connections 54, 55 respectively. A pressure switch 56 is connected so as to be sensitive to the pressure in the connection 55. The cup-shaped member 46 has a passage 57 which connects the groove 50 to the space within the cylinder between the cup-shaped member 46 and the piston 47. A further passage 58 in the cup-shaped member 46 communicates with a drilling 59 formed in the wall of the cylinder 44, such drilling opening into the end of the cylidner remote from the cup-shaped member 46. The passage 58 communicates at its other end with the groove 51.

Thus, in use, the draft member 39 can be moved to the projecting position in FIGURE 1 by the introduction of pressurised fluid via the connection 54. The member 39 can be withdrawn into the spindle after positioning of the chuck thereon, by the introduction of fluid under pressure up to the connection 55. The pressure switch 56 serves to sense when movement of the member 39 is completed.

The member 39 is spring loaded by means of a powerful compression spring 60 within the draft member 39. One end of the spring 60 is abutted against a plug 61 fitted into the end of the member 39 and its other end is abutted against a member 62 on a rod 63 extending through a hole in the plug 61 and secured to the cup-shaped member 46.

Keyed to the stem 48 of the cup-shaped member 46 is a boss 64 which, therefore, rotates with the spindle 10. This boss 64 is connected via a flexible drive coupling 65 to the control unit 19. The boss 64 also carries a pair of trips 66, 67 which co-act respectively with a pair of position sensing devices 68, 69 the outputs of which are fed into the control unit 19 previously mentioned.

FIGURE 6 shows a limit switch arrangement for detecting the position of the clamping ring 20. This switch makes use of a notch 70 cut in the member 20 to displace a spring loaded plunger 71 to actuate the switch 72 when the member 20 is moved out of engagement with the ring 21.

In use therefore, when it is desired to mount the chuck 36 on the spindle end, the chuck spindle is stopped in the position shown in FIGURES 1 and 5 and clamped in that position by displacement of the ring 20. Pressurised fluid is then introduced via the connection 54 to cause the end of the member 39 to project from the spindle nose. The chuck is then presented to the spindle nose with the stop 42 adjacent the tooth of the head 41 at the left end of the gap in the head 41 (as viewed in FIGURE 2). The spindle is then uncleamped and turned through 22½° whilst the chuck is held. This movement brings the splines of the head 41 into overlapping relationship with the splines in the hole 40. Pressure at the connection 54 is then relieved and pressure is applied to the connection 55 to draw the member 39 into the spindle thereby drawing the two coupling rings 29, 37 into accurate inter-engagement. When the pressure switch 56 is operated on cessation of the movement of the member 39 the spindle is released for rotation for subsequent machining operation. The spring 60 serves to ensure that the chuck does not fall from the spindle in the event of an hydraulic power failure.

Having thus described my invention what I claim as new and desire to secure by Letters Patent:

1. A lathe having a hollow spindle on the end of which is mounted one part of an annular toothed coupling extending in a plane perpendicular to the spindle axis and having teeth shaped to mesh with a co-acting coupling part on a chuck or other work holding device so as to align the coupling parts accurately when axial pressure is applied thereto, and means extending through the spindle for engaging such a coupling part of the chuck or other work holding device to apply axial pressure thereto.

2. A lathe as claimed in claim 1 in which each toothed coupling part is formed with radially extending teeth having inclined flanks which are inter-engaged with those of the other toothed coupling part.

3. A lathe as claimed in claim 1 in which said means extending through the spindle comprises an elongated draft member having thereon a head adapted to be interlockingly interengaged with the toothed coupling part of the chuck.

4. A lathe as claimed in claim 3 in which the head of said draft member is of splined form adapted to be inserted through a splined opening in the toothed coupling ring of the chuck, and arranged so that the ends of the splines can be inter-engaged so that an axial pull applied to the draft member is transmitted to the toothed coupling part of the chuck.

5. A lathe as claimed in claim 3 in which the draft member is connected to a double acting hydraulic piston and cylinder unit for applying an axial pull thereto.

6. A lathe as claimed in claim 5 in which said hydraulic piston and cylinder unit comprises a cylinder secured to the end of the spindle remote from the end having the toothed coupling part mounted thereon, and a piston secured to the draft member and sealingly and slidingly engaged inside said cylinder.

7. A lathe as claimed in claim 5 in which spring means are provided for acting upon the draft member for applying a pull thereto to prevent the chuck from falling from the spindle in the event of an hydraulic power failure.

8. A lathe as claimed in claim 7 in which said spring means comprises a compression spring disposed within the draft member and abutting at one end against a plug in the end of the draft member and at the other end against a member carried on the end of a rod extending through a hole in said plug and secured to a part rotatable with the spindle.

References Cited

UNITED STATES PATENTS 1,980,336   11/1934   Hoagland _____ 82—30

FOREIGN PATENTS 833,577   3/1952   Germany.

LEONIDAS VLACHOS, Primary Examiner

U.S. Cl. X.R.

82—40; 279—1